United States Patent [19]

Martin et al.

[11] Patent Number: 4,755,374
[45] Date of Patent: Jul. 5, 1988

[54] ALUMINUM HYDROXIDE PRODUCTION

[75] Inventors: Edward S. Martin, New Kensington; Mark L. Weaver, Allison Park, both of Pa.

[73] Assignee: Aluminum Company of America, Pittsburgh, Pa.

[21] Appl. No.: 887,000

[22] Filed: Jul. 18, 1986

[51] Int. Cl.$^4$ ............................................. C01F 7/42
[52] U.S. Cl. ................................... 423/627; 423/629; 423/628; 502/439
[58] Field of Search ............... 423/627, 629, 628; 502/439

[56] References Cited

U.S. PATENT DOCUMENTS 2,733,219  1/1956  Block ................................ 423/127
3,488,147  1/1970  Keith et al. ...................... 423/127
3,494,733  2/1970  Keith et al. ...................... 423/127

Primary Examiner—Robert L. Stoll
Attorney, Agent, or Firm—Daniel A. Sullivan, Jr.

[57] ABSTRACT

A method for the production of aluminum hydroxide, including reacting water in the liquid phase and aluminum at a pH above about 12.4. In this pH range, aluminum hydroxide is produced at acceptable rates both for aluminum surface areas above 75,000 mm$^2$/g and for aluminum surface area of less than about 50,000 mm$^2$ per gram, and even down to 20 mm$^2$ per gram. According to an alternative view of the invention, it is characterized by the production of aluminum hydroxide by reacting aluminum with liquid water containing choline.

10 Claims, 1 Drawing Sheet

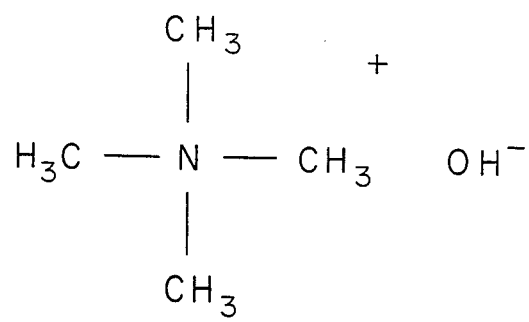
FIG.1-(PRIOR ART)
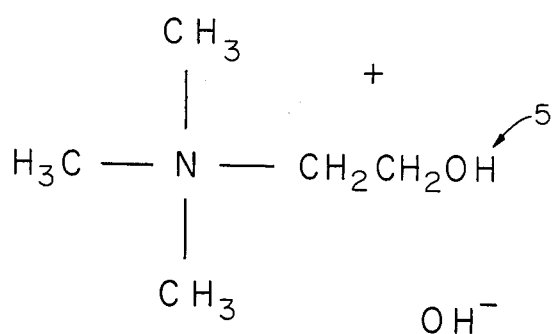
FIG.2

ALUMINUM HYDROXIDE PRODUCTION

BACKGROUND OF THE INVENTION

This invention relates to the production of aluminum trihydroxide.

U.S. Pat. No. 3,494,733 of Keith and Cornely, issued Feb. 10, 1970, for "Method for the Production of Alumina Trihydrate Dominant in Bayerite" emphasizes a "discovery that aluminum metal of high surface area and in a very fine state of subdivision, can be reacted with water at a basic pH to yield a predominantly trihydrate alumina without the need for extensive aging." As to the high surface area and very fine state of subdivision, Keith and Cornely state that the aluminum particles used in their process should have surface area lying in the range 75 thousand to 1 million square millimeters/gram.

Others have experimented with the reaction of aluminum metal with high pressure steam. See Tremper and Gordon, "Agglomeration Effects on the Sintering of Alumina Powders Prepared by Autoclaving Aluminum Metal" in "Ceramic Processing Before Firing", Onoda and Hench, pp 153–76, John Wiley & Sons, N.Y. (1978).

SUMMARY OF THE INVENTION

It is an object of the invention to provide a method for the production of aluminum hydroxide overcoming certain disadvantages of the process of Keith and Cornely.

This as well as other objects which will become apparent in the discussion that follows are achieved, according to the present invention, by providing a method for the production of aluminum hydroxide, including reacting water in the liquid phase and aluminum at a pH above about 12.4. In this pH range, aluminum hydroxide is produced at acceptable rates both for aluminum surface areas within the range required by Keith and Cornely and for aluminum surface area of less than about 50,000 mm$^2$ per gram, and even down to 34, or even 20, mm$^2$ per gram. According to an alternative view of the invention, it is characterized by the production of aluminum hydroxide by reacting aluminum with liquid water containing choline.

Nomenclature as used herein for aluminum hydroxides is according to FIG. 1 in the article entitled "Aluminum Oxide" in the 5th edition of Ullmann's Encyclopedia of Industrial Chemistry. The term "trihydrate alumina" as used by Keith and Cornely is aluminum trihydroxide in the system of Ullmann's FIG. 1.

Unless noted otherwise, percentages herein are percentages by weight.

BRIEF DESCRIPTION OF THE DRAWINGS

FIG. 1 depicts the structural formula of tetramethylammonium hydroxide.

FIG. 2 depicts the structural formula of choline.

DESCRIPTION OF THE PREFERRED EMBODIMENTS

In the present invention, aluminum hydroxide is produced, as in Keith and Cornely, by the reaction of water with aluminum metal. An attraction of producing aluminum hydroxide in this way lies in the fact that aluminum metal of very high purity is available in the marketplace at reasonable prices as compared to the cost of obtaining similar purity aluminum hydroxide by direct production from bauxite.

The process of Keith and Cornely is, however, disadvantageous from a number of points of view—for instance from the point of view of product contamination when one uses one of their suggested materials containing sodium or chlorine, for example, or from the point of view of ability to react the aluminum, particularly aluminum of larger particle, or piece, size. Keith and Cornely teach in their above-cited U.S. Pat. No. 3,494,733 that the aluminum metal must have high surface area and a very fine state of subdivision; it should have surface area lying in the range 75 thousand to 1 million square millimeters per gram. The difficulty in obtaining reaction is treated in another U.S. patent of Keith and Cornely, namely U.S. Pat. No. 3,488,147.

These disadvantages of the process of Keith and Cornely are overcome in the present invention through the use of choline as an added material and through the use of higher pH—above about 12.4. The closest Keith and Cornely come to choline as an added material is tetramethylammonium hydroxide, whose structure is as shown in the FIG. 1 attached hereto. This is Keith and Cornely's example of a lower alkyl amine (claim 7 of U.S. Pat. No. 3,494,733). Choline is quite different, because one of the groups attached to the quaternary nitrogen is not alkyl but rather —CH$_2$CH$_2$—OH. See the structure of choline as presented in the attached FIG. 2.

In terms of pH, Keith and Cornely recommend a basic pH up to only about 12.

Important for the success of additives such as the chemicals suggested by Keith and Cornely and the choline used in the present invention is that their aluminates must be soluble. Only then is a cyclic digest possible, wherein the additive is recycled for reuse in the production of more aluminum hydroxide. Formation of insoluble aluminates would make the process uneconomic, by consuming the additive. The presence of the covalently bonded OH at location 5 in FIG. 2 would indicate a non-soluble aluminate (the presence of —CH$_2$—CH$_2$—OH would cause the aluminate to be insoluble due to strong interaction between the covalent OH and the Al$^{3+}$ ion), but we have found, to the contrary, that such does not, in fact, occur.

Choline concentrations of about 0.05 to 2 mols per liter (M) are effective for promoting the reaction of water and aluminum metal according to the present invention. The range of 0.05 to 1 mol per liter is preferred. The lower end of this concentration range causes a pH of about 12.7, and pH rises to above 13 as one exceeds around 0.1M. In contrast, the pH used in Example IV of Keith and Cornely's U.S. Pat. No. 3,494,733 (their Example IV is the example where tetramethylammonium hydroxide is used) is 9.5, this indicating a tetramethylammonium hydroxide concentration in the neighborhood of 3.2×10$^{-5}$M.

Interestingly, a relationship between choline concentration and the resulting predominant form of aluminum hydroxide has been found, lower concentrations giving bayerite and higher concentrations giving gibbsite. Thus, low concentrations of about 0.05M choline yields predominantly bayerite, while concentrations of 0.5M and above yield all gibbsite. This we know to be true between 22° and 75° C. Gibbsite is desirable for production of ceramic aluminas. The ability to select crystal phase by adjustment of choline concentration gives much more flexibility than in U.S. Pat. No. 3,494,733.

See particularly the comment in U.S. Pat. No. 3,494,733 on temperature influence on phase at its column 4, lines 16–24.

Temperature of the aqueous solution used in the invention is preferably kept above about 40° C., in order to prevent scale adhesion on the aluminum metal being reacted.

It is advantageous to stir the liquid in the reaction vessel. Stirring provides intimate contact of metal and solution and maintains a homogeneous concentration in the solution. The stirring need not be so vigorous as blender, or high shear, mixing. Stirring reduces scale adhesion on the vessel containing the reactants. Stirring also causes autoprecipitation, i.e. precipitation without any need for seeding.

While the invention works well for aluminum metal of relatively high surface area, as demonstrated by Examples I to IV below, it is still quite successful with aluminum of lower surface area, even at surface areas of less than 400 mm$^2$/g, as demonstrated by the remaining examples. The ability to use coarser aluminum metal is important from a safety point of view, since danger of explosion increases with increasing surface area. The ability to use coarser metal, e.g. less than 400 mm$^2$/g, is also important from the point of view of purity of the aluminum hydroxide product; this is true, because the atomization process for making powdered aluminum gives the opportunity for impurities to come into the metal that were not in the aluminum to begin with.

Reaction time is in general 4 to 6 hours, with up to two days being required for very coarse metal. The longer reaction times for the coarser metal is not necessarily of disadvantage, since coarser metal is cheaper and batch operation permits one to simply load the reactants into a vessel and permit the reaction to go to completion. Continuous operation is, of course, also possible.

As to purity, the purer the aluminum metal, the purer the aluminum hydroxide product. U.S. Pat. No. 4,115,215 shows the production of aluminum metal of 99.99% (referred to as "4-9's") purity, and metal of that purity can be purchased. In fact, 5- and even 6-9's purity aluminum is readily available on the market. A process based on the decomposition of organic compounds containing aluminum is said to yield 7-9's purity aluminum.

Besides attention being given to the aluminum metal, impurities can also result from contaminants in the water and the choline. Deionized, or perhaps double-deionized, and distilled water is suitable. Depending on the end use of the aluminum hydroxide, different impurities are of concern to different end uses. Iron and copper impurities in the aluminum are disadvantageous to the invention, because these impurities retard the aluminum-water reaction.

The aluminum hydroxide product of the invention will, in general, have an average particle size of about 4 to 12 microns, with higher choline concentrations giving the larger average particle sizes.

Aluminum hydroxide produced according to the present invention can be calcined to produce high purity alumina useful, for example, in the manufacture of high intensity sodium vapor discharge lamps. Any remnant choline is driven off or destroyed in the calcination, and other impurity concentrations can be reduced, depending on their vapor pressures or the vapor pressures of their oxides.

Other uses for the calcined product of the invention are as polishing compound, in cutting tools, in bioceramics, in electronic substrates, synthetic jewels, watch covers, special windows (such as the window of the bar-code readers of checkout counters), encapsulating lids of various types, etc.

Freedom from the alkali metal contamination characterizing aluminas directly made from Bayer process aluminum trihydroxide makes the aluminum hydroxide product of the present invention suitable for preparation of activated (transition) alumina catalyst supports.

Naturally, there are a number of areas of application where purity does not have to be greater than 99.5% where the invention can as well be applied.

Further illustrative of the invention are the following examples:

EXAMPLE I

A solution of choline in water was made using Eastman practical grade 45% choline in methanol to yield a solution concentration of 0.05 mols choline per liter of solution. The solution was brought to a temperature of 40° C. and stirred using an air stirrer. While maintaining stirring, 40.5 grams of aluminum powder, namely Alcoa High-Purity Atomized Powder Grade 7123 powder (minimum aluminum content of 99.97%) having an average particle size of 17 microns and a surface area of 250,000 mm$^2$/gm, first mixed with a small amount of deionized water to guard against dusting, was mixed with the choline solution. The 40.5 grams of aluminum provided a metal concentration of 2 mols per liter of choline solution. The aluminum reacted with the water and hydrogen was evolved. The temperature rose to 81°–86° C. and was maintained there by cooling water circulated through stainless steel tubing immersed in the solution. The mixture was allowed to react until hydrogen evolution ceased. After another period amounting to about ⅓ the amount of time to cessation of hydrogen evolution, the reaction mixture was filtered using Watmann No. 42 filter paper to collect an aluminum hydroxide product of about 5 to 10 microns particle size. Total reaction time (to hydrogen evolution cessation +⅓) was 3.83 hours. X-ray diffraction analysis of the product showed a major portion of bayerite with a probable minor portion of boehmite.

Table I presents a summary of the experimental conditions used for this example. Table IV presents the types of aluminum hydroxide detected by X-ray diffraction analysis.

EXAMPLE II

The purpose of this example was to determine the effect of solution metal concentration. Procedure was as in Example I, except that 101.1 grams of aluminum was used, this amounting to a metal concentration of 5 mols per liter of choline solution. Temperature control became more difficult (the larger amount of aluminum resulted in increased heat evolution), as evidenced by the greater temperature range in Table I. However, the process, as embodied in this Example, is still well within the capabilities of any of a multitude of temperature control techniques familiar to chemical engineers. Aluminum hydroxide types recovered were as presented in Table IV.

EXAMPLES III–IV

The purpose of these examples was to determine the effect of lower operating temperature. Procedure was as in Examples I and II, except that temperature was controlled to the region around 60°. Experimental conditions and results were as displayed in Table I. Aluminum hydroxide types recovered were as presented in Table IV.

EXAMPLES V-VII

In these examples, a granular aluminum metal of lower surface area was used to provide an idea of the effect of surface area, by comparison with Examples I-IV. The metal measured 99.7% Al in purity. Choline concentration was also varied, to develop an indication of its effect on reaction time. Procedure was as in Example I, with parameter and result differences as noted in Table II. In Examples V and VI, 61 grams of aluminum were charged, and the experiments were stopped before complete reaction. In Example VII, all of the aluminum charged was reacted. Aluminum hydroxide types recovered were as presented in Table V.

EXAMPLE VIII

In this example, aluminum flake (or, perhaps more correctly stated, pebbles) of 99.99% purity and still lower surface area was used. The pebbles are a product of Aluminum Company of America bearing the designation "Alcoa Granulated Ingot", Product Code No. 1301. In this case, unlike Examples I-VII, the reactor was a packed-bed-type formed by the pebbles in a vertical tube of 1½-inch internal diameter and 18-inches height. Choline solution circulated upflow through the bed, at a 1 liter per minute flow rate, 5 cm/sec average flow velocity, to provide the contact achieved by stirring in Examples I-VII. Hydrogen gas was vented at the top of the tube. The choline solution was circulated into the bottom of the tube from a holding tank, brought off the top of the tube, and recirculated back to the holding tank. The holding tank was sufficiently large that the aluminum hydroxide product coming from the top of the tube settled to the bottom of the tank, with the circulation to the bottom of the tube being from clarified solution above the bottom of the tank. Experimental conditions and results are presented in Tables II and V. Temperature was measured in the holding tank.

EXAMPLES IX-XIII

In these examples, aluminum surface area was further decreased. Solutions of choline in water were made as in Example I to yield solution concentrations as given in Table III. The solutions were brought to the temperatures indicated in Table III. Aluminum rods having initial dimensions of 9.3 mm diameter by 33 to 35 mm length were then added to the liquid and the liquid was stirred above the immersed rods. The rods were about 99.99% pure aluminum metal. Reaction times and weight of aluminum reacted were as given in Table III. Unlike Examples X-XIII, there was no stirring in Example IX. Weight of aluminum hydroxide recovered, and the identity of the aluminum hydroxide —gibbsite—appears in Table VI.

EXAMPLE IXA

Example IX was varied as follows: Instead of a stagnant solution, the solution was continuously stirred. The surface area of the aluminum was 335 $mm^2$/gram. For a charge of 25.1 grams, 2.56 grams of aluminum reacted in 6.5 hours. The weight of recovered aluminum hydroxide product was 6.34 grams, a little less than stoichiometric due to scale formation on the reactor walls. The product contained bayerite and nordstrandite.

EXAMPLES XIV-XXXII

Parameters for these examples are shown in Tables IIIA and IIIB.

The data in Tables IIIA show that there is no considtent difference in rate of the choline-water-aluminum reaction at 60° C. between choline solutions which contain methanol and those which do not. The methanol-free choline was prepared by passing choline chloride through a strong-base ion-exchange resin, Rexyn 201 of Fisher Scientific.

The data for these examples also shows that there is no consistent difference in the reaction rate between a magnetically stirred reactor and a larger mechanically stirred reactor.

The data in Tables IIIB show that the rate for 0.05M choline is much slower than the rate for 0.125M choline (a twelve-fold decrease, while the rate of sodium hydroxide attack varies as the square root of NaOH concentration; see GMELINS HANDBUCH DER ANORGANISCHEN CHEMIE, 8th Edition, Aluminum, Teil A, Abteilung I, Sys.-Nr. 35, p 409, Verlag Chemie, Berlin 1934–35). The rate also falls when the choline concentration is 2.0M, this being the same result seen for 2.0M choline at 60° C.

TABLE I

Choline-Al—$H_2O$ Reaction

| Example | Experiment | Choline Concentration (M)* | Temperature °C. | Metal Surface Area ($mm^2$/gram) | Reaction Time, Hr. | Wt. Al Reacted, grams |
|---------|------------|----------------------------|-----------------|----------------------------------|--------------------|-----------------------|
| I | HPA-CHV1 | 0.05 | 81–86 | 250,000** | 3.83 | 40.5 |
| II | HPA-CHV2 | 0.05 | 78–89 | 250,000** | 3.70 | 101.0 |
| III | HPA-CHV3 | 0.05 | 54–67 | 250,000** | 4.92 | 40.5 |
| IV | HPA-CHV4 | 0.05 | 55–65 | 250,000** | 5.50 | 101.0 |

*mols/liter
**Alcoa 7123 Powder, average particle size = 17 microns.

TABLE II

Choline-Al—$H_2O$ Reaction

| Example | Experiment | Choline Concentration (M)* | Temperature °C. | Metal Surface Area ($mm^2$/gram) | Reaction Time, Hr. | Wt. Al Reacted, grams |
|---------|------------|----------------------------|-----------------|----------------------------------|--------------------|-----------------------|
| V | HPA-DS1 | 0.25 | 75 | 50,000 | 3.66 | 55.5 |
| VI | HPA-DS2 | 0.125 | 74–77 | 50,000 | 5.58 | 45.6 |
| VII | HPA-DS3 | 0.25 | 71–77 | 50,000 | 5.00 | 101.0 |

TABLE II-continued

| | | Choline-Al—H₂O Reaction | | | | |
|---|---|---|---|---|---|---|
| Example | Experiment | Choline Concentration (M)* | Temperature °C. | Metal Surface Area (mm²/gram) | Reaction Time, Hr. | Wt. Al Reacted, grams |
| VIII | HPA-DS12 | 0.25 | 73–75 | 1,400 | 4.50 | 73.0 |

*mols/liter

TABLE III

| | | Choline-Al—H₂O Reaction | | | | Wt. Al | |
|---|---|---|---|---|---|---|---|
| Example | Experiment | Choline Concentration (M)* | Temperature °C. | Metal Surface Area (mm²/gram) | Reaction Time, Hr. | Initial | Reacted, grams |
| IX | 21804-37 | 0.05 | 75 | 190 | 33.0 | 5.0 | 0.31 |
| IXA | 22660-15 | 0.05 | 75 | 335 | 6.5 | 25.1 | 2.56 |
| X | 21886-4 | 0.125 | 60 | 190 | 30.4 | 131.5 | 42.4 |
| XI | 21886-6 | 0.50 | 60 | 190 | 24.0 | 121.6 | 52.11 |
| XII | 21886-8 | 0.125 | 60 | 190 | 4.0 | 122.8 | 5.6 |
| XIII | 21804-48B | 0.50 | 45 | 190 | 24.0 | 25.2 | 3.18 |

*mols/liter

TABLE IIIA

Aluminum Reaction with Choline-Water Solutions at 60° C.
Effect of Methanol on Reaction Rates

| Example | Experiment | Choline Concentration (M)** | Reactor Type | Methanol Concentration (M)** | Initial Al Metal Wt (gm) | Metal Surface Area (mm)²/gm | Weight Al Reacted (gm) | Reaction Time (hrs) | Weight Al(OH)₃ Recovered (gm) | Reaction Rate* |
|---|---|---|---|---|---|---|---|---|---|---|
| XIV | 22523-12 | 0.125 | 1 | Nil | 20.93 | 190 | 4.35 | 30.07 | 13.53 | 1.45 |
| XV | 22523-13 | 0.125 | 1 | Nil | 20.02 | 190 | 3.01 | 25.03 | 9.54 | 1.26 |
| XVI | 22523-15 | 0.125 | 1 | 0.58 | 20.81 | 190 | 8.21 | 28.58 | 22.27 | 2.80 |
| XVII | 21886-27 | 0.25 | 2 | 1.15 | 129.29 | 190 | 73.01 | 27.0 | 215.21 | 4.08 |
| XVIII | 22523-4 | 0.25 | 1 | Nil | 18.45 | 190 | 3.07 | 6.33 | 5.39 | 4.16 |
| XIX | 21886-26 | 0.50 | 2 | 2.31 | 131.86 | 190 | 66.19 | 24.25 | 176.24 | 4.04 |
| XX | 22253-9 | 0.50 | 1 | Nil | 20.72 | 190 | 3.43 | 6.20 | 6.39 | 5.38 |
| XXI | 21632-37 | 0.50 | 1 | 2.31 | 25.17 | 190 | 12.59 | 24.0 | 33.1 | 5.15 |
| XXII | 22523-8 | 0.59 | 1 | Nil | 22.05 | 190 | 4.27 | 6.67 | 4.75 | 5.85 |
| XXIII | 21886-35 | 1.0 | 1 | 4.62 | 22.99 | 190 | 13.61 | 25.17 | 37.4 | 4.33 |
| XXIV | 21886-28 | 1.0 | 2 | 4.62 | 133.66 | 190 | 76.45 | 26.92 | 211.07 | 4.14 |
| XXV | 21886-48 | 1.5 | 1 | 6.93 | 22.58 | 190 | 7.27 | 7.42 | 15.49 | 8.37 |
| XXVI | 21886-39 | 2.0 | 1 | 9.24 | 21.83 | 190 | 6.82 | 29.58 | 13.98 | 2.08 |

* $\dfrac{\text{gram moles Aluminum reacted}}{(m^2 \text{ Al}) \text{ hr}}$

**mols/liter
Reactor Type 1 = Magnetically stirred culture flask
2 = Mechanically stirred reactor

TABLE IIIB

Aluminum Reaction with Choline-Water Solutions at 75° C.

| Example | Experiment | Choline Concentration (M)** | Methanol Concentration (M)** | Initial Al Metal Wt (gm) | Metal Surface Area (mm)²/gm | Weight Al Reacted (gm) | Reaction Time (hrs) | Weight Al(OH)₃ Recovered (gm) | Reaction Rate* (m² Al) hr |
|---|---|---|---|---|---|---|---|---|---|
| XXVII | 22660-3 | 0.05 | 0.23 | 20.23 | 544 | 4.27 | 27.5 | 9.93 | 0.52 |
| XXVIII | 21804-11 | 0.125 | 0.58 | 25.96 | 190 | 4.12 | 3.78 | 8.92 | 6.39 |
| XXIX | 21804-15 | 0.125 | 0.58 | 25.69 | 190 | 6.07 | 5.11 | 15.00 | 7.24 |
| XXX | 21804-1 | 0.50 | 2.31 | 25.22 | 190 | 16.87 | 20.5 | 47.75 | 8.91 |
| XXXI | 21804-13 | 0.50 | 2.31 | 24.99 | 190 | 4.81 | 5.33 | 9.65 | 7.97 |
| XXXII | 21804-42 | 2.0 | 9.24 | 20.05 | 190 | 6.59 | 25.0 | 12.67 | 2.59 |

* $\dfrac{\text{gram moles Aluminum reacted}}{(m^2 \text{ Al}) \text{ hr}}$

**mols/liter

TABLE IV

| | Choline-Al—H₂O Reaction |
|---|---|
| Example | Aluminum Hydroxide Phase(s) |
| I | Bayerite (Major), Boehmite (Minor) |
| II | Bayerite (Major), Boehmite (Minor) |
| III | Bayerite (Major), Boehmite (Minor) |
| IV | Bayerite (Major), Boehmite (Minor) |

TABLE V

| | Choline-Al—H₂O Reaction | |
|---|---|---|
| Example | Wt. of Aluminum Hydroxide Recovered | Aluminum Hydroxide Phase(s) |
| V | — | Gibbsite (Major), Nordstrandite (Major) |
| VI | — | Gibbsite (Major), Nordstrandite (Major), Bayerite (Major) |

TABLE V-continued

Choline-Al—H₂O Reaction

| Example | Wt. of Aluminum Hydroxide Recovered | Aluminum Hydroxide Phase(s) |
|---|---|---|
| VII | — | Gibbsite (Major), Nordstrandite (Major), Bayerite (Major) |
| VIII | 294.17 | — |

TABLE VI

Choline-Al—H₂O Reaction

| Example | Wt. of Aluminum Hydroxide Recovered | Aluminum Hydroxide Phase(s) |
|---|---|---|
| IX | 0.67 | Bayerite, Minor Nordstrandite, amorphous |
| IXA | 6.34 | Bayerite, Nordstrandite |
| X | 116.08 | All Gibbsite |
| XI | 134.36 | All Gibbsite |
| XII | — | All Gibbsite |
| XIII | 5.61 | All Gibbsite |

It will be understood that the above description of the present invention is susceptible to various modifications, changes and adaptations and the same are intended to be comprehended within the meaning and range of equivalents of the appended claims.

What is claimed is:

1. A method for the production of aluminum hydroxide, comprising reacting water in the liquid phase and aluminum of surface area of at least 20 mm² per gram at a pH above about 12.4 for producing a reaction mixture containing aluminum hydroxide, and collecting solid aluminum hydroxide from the reaction mixture, the reaction being carried out in the presence of choline at a concentration of about 0.05 to 2 mols per liter.

2. A method as claimed in claim 1, the aluminum surface area being less than about 50,000 mm²/g.

3. A method as claimed in claim 3, the aluminum surface area being less than about 400 mm²/g.

4. A method as claimed in claim 1, the concentration of choline being about 0.05M for producing bayerite.

5. A method as claimed in claim 1, the concentration of choline being greater than or equal to about 0.5M for producing gibbsite.

6. A method for the production of aluminum hydroxide, comprising reacting aluminum of surface area of at least 20 mm² per gram with liquid water containing choline at a concentration of about 0.05 to 2 mols per liter for producing a reaction mixture containing aluminum hydroxide, and collecting solid aluminum hydroxide from the reaction mixture.

7. A method as claimed in claim 6, the aluminum surface area being less than about 50,000 mm²/g.

8. A method as claimed in claim 7, the aluminum surface area being less than about 400 mm²/g.

9. A method as claimed in claim 6, the concentration of choline being about 0.05M for producing bayerite.

10. A method as claimed in claim 6, the concentration of choline being greater than about 0.5M for producing gibbsite.

* * * * *

UNITED STATES PATENT AND TRADEMARK OFFICE
CERTIFICATE OF CORRECTION

PATENT NO. : 4,755,374

DATED : July 5, 1988

INVENTOR(S) : Edward S. Martin and Mark L. Weaver

It is certified that error appears in the above-identified patent and that said Letters Patent is hereby corrected as shown below:

Col. 10, claim 3, line 1    Change "claim 3" to --claim 2--.

Signed and Sealed this

Twenty-ninth Day of November, 1988

Attest:

DONALD J. QUIGG

Attesting Officer

Commissioner of Patents and Trademarks